Figure 1:
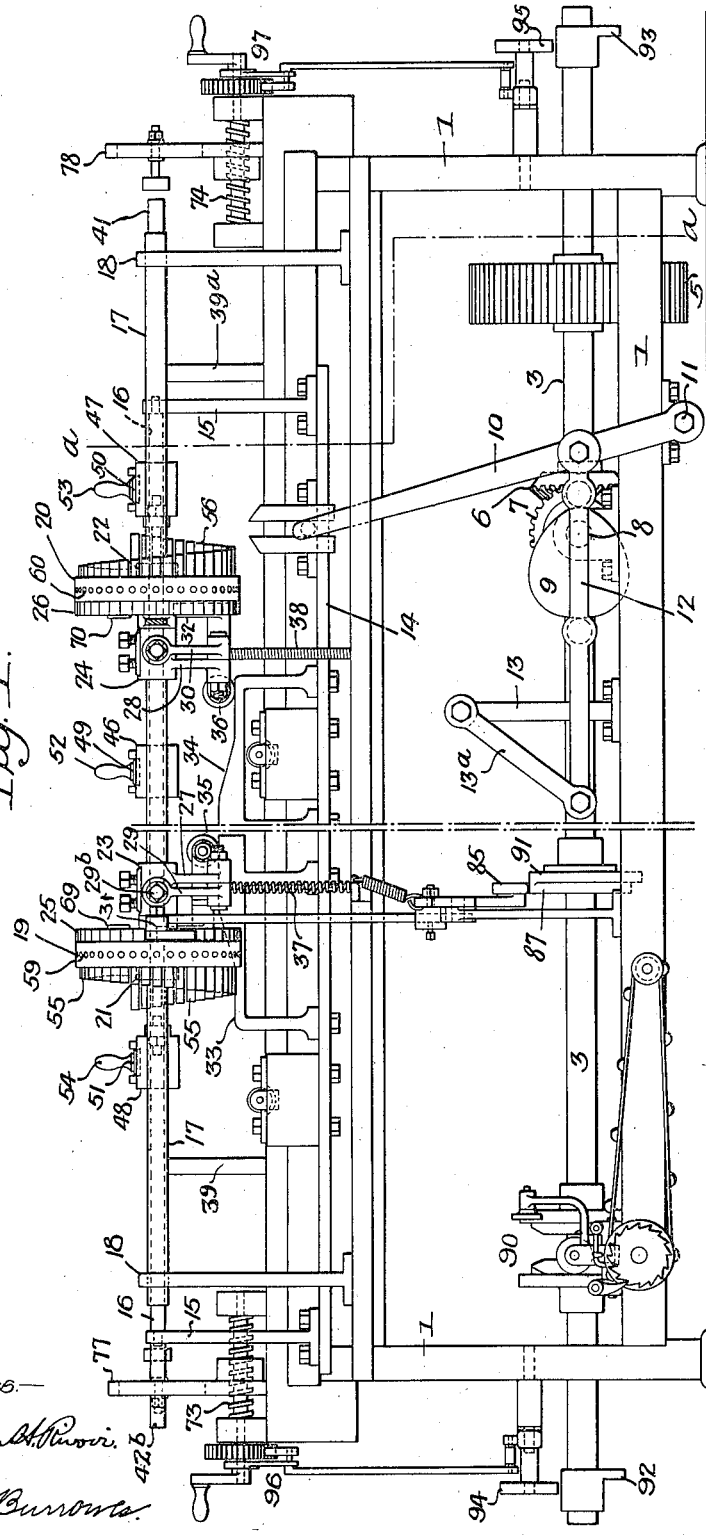

G. A. LANDENBERGER.
KNITTING MACHINE.
APPLICATION FILED NOV. 16, 1912.

1,134,749.

Patented Apr. 6, 1915.
6 SHEETS—SHEET 2.

Witnesses—

Inventor—
Gustav A. Landenberger
by his Attorneys—
Howson & Howson

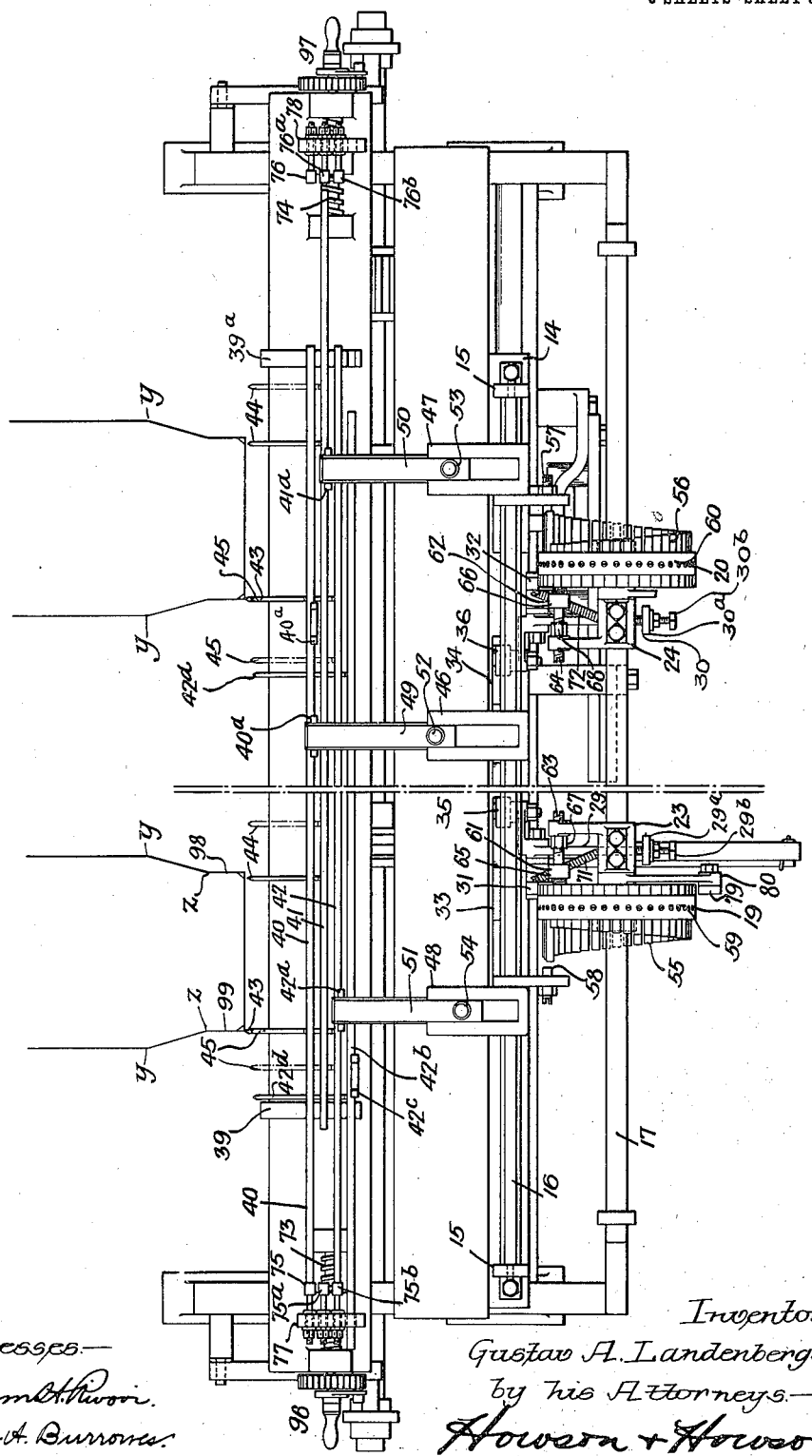

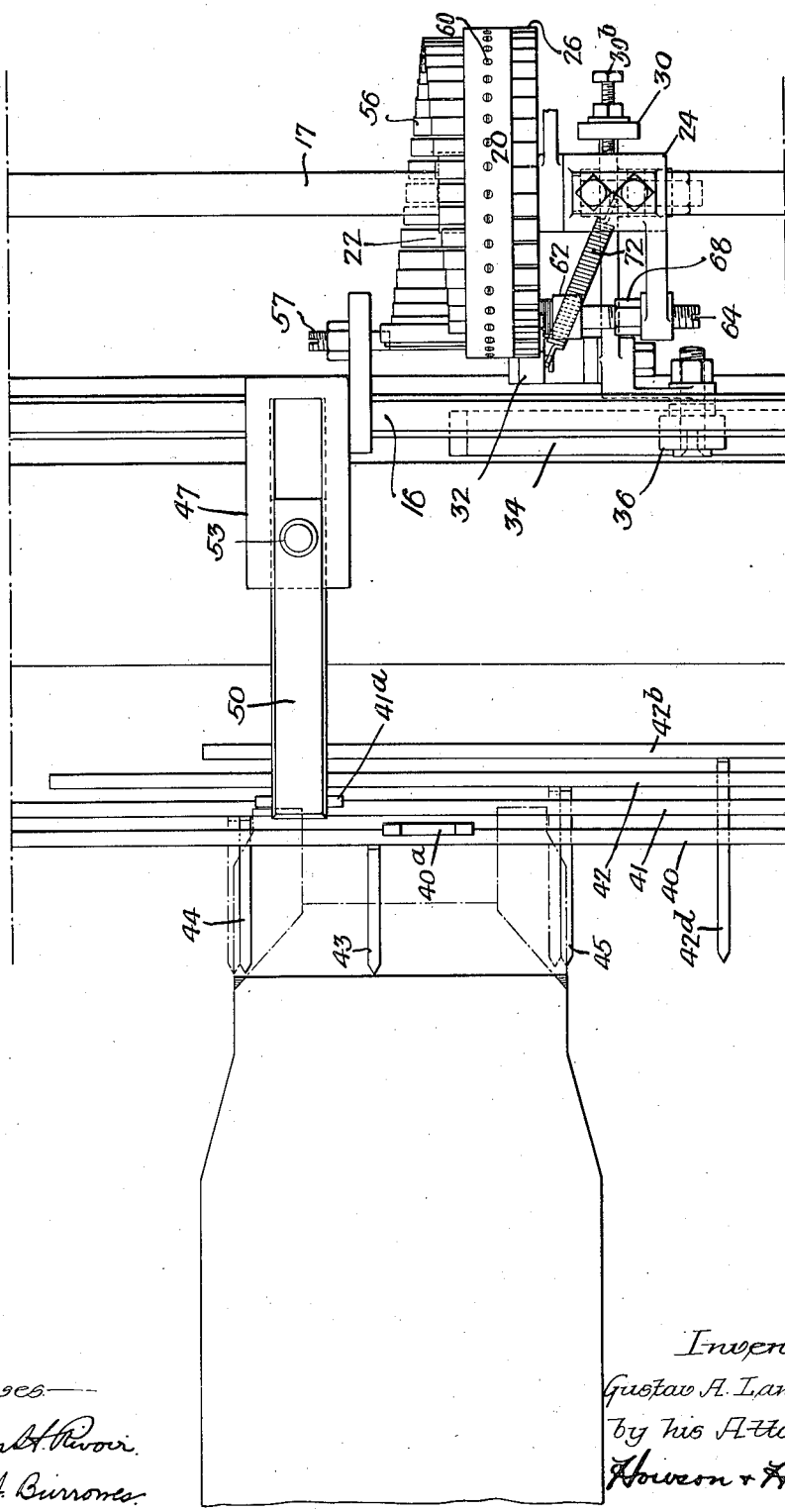

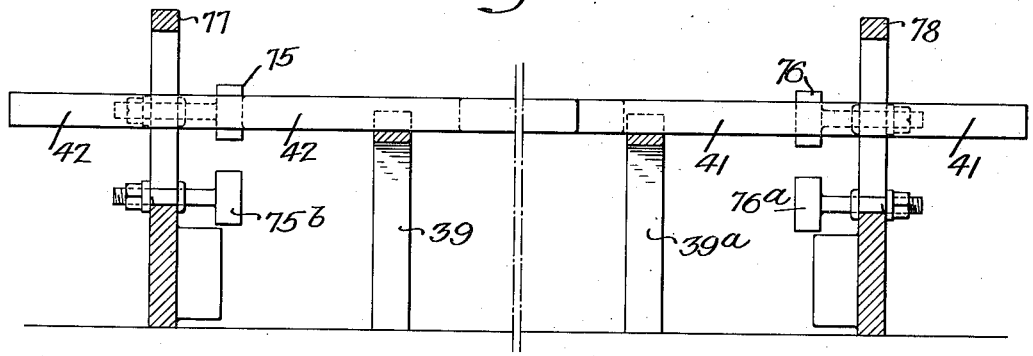
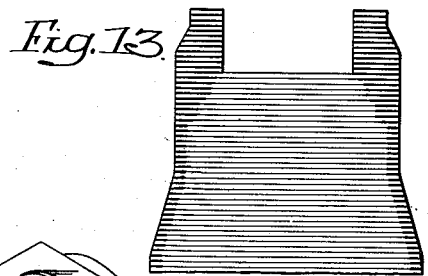
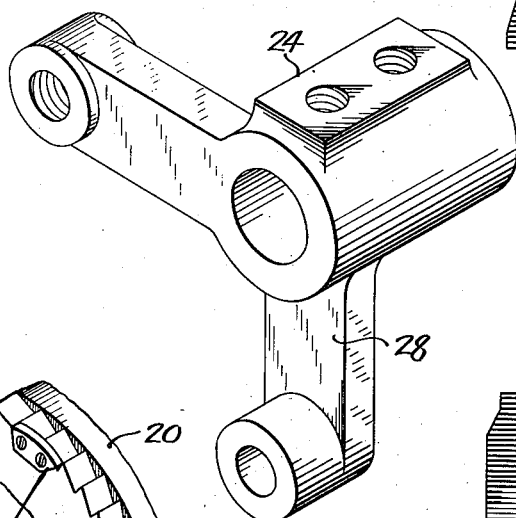
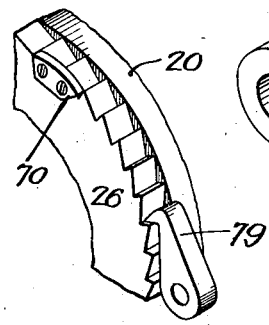
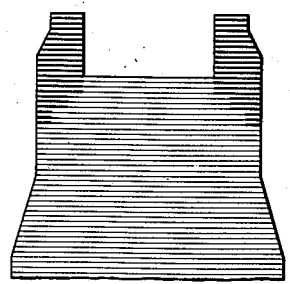

G. A. LANDENBERGER.
KNITTING MACHINE.
APPLICATION FILED NOV. 16, 1912.

1,134,749.

Patented Apr. 6, 1915.
6 SHEETS—SHEET 6.

Witnesses—

Inventor—
Gustav A. Landenberger
by his Attorneys—
Howson & Howson

UNITED STATES PATENT OFFICE.

GUSTAV A. LANDENBERGER, OF PHILADELPHIA, PENNSYLVANIA.

KNITTING-MACHINE.

1,134,749.  Specification of Letters Patent.  Patented Apr. 6, 1915.

Application filed November 16, 1912. Serial No. 731,820.

*To all whom it may concern:*

Be it known that I, GUSTAV A. LANDENBERGER, a subject of the Emperor of Austria-Hungary, having declared my intentions of becoming a citizen of the United States, residing in Philadelphia, Pennsylvania, have invented certain Improvements in Knitting-Machines, of which the following is a specification.

My invention relates to knitting and consists of yarn-feed controlling mechanism for knitting machines, being particularly serviceable for controlling the movement of the yarn carriers which feed extra or reinforcing threads to certain of the needles, such for example as to the needles which form heel portions of stockings on straight knitting frames such as the "Cotton" type which have a plurality of banks of needles; each bank being capable of knitting a separate stocking leg or other fabric.

Heretofore in the manufacture of full fashioned stockings on straight knitting machines of the above described type, the splicing or reinforcing threads for the heel portion were generally inserted in such a manner that the line of intersection between the reinforced knitted web, constituting the heel portion, and the ordinary knitted web, constituting the main portion of the stocking, ran in a line substantially at right angles to the wales of the web. This abrupt change caused a very unsightly portion in the stocking which tended to detract from the graceful lines caused by the shaping of the leg portions and the ankle portion.

One object of my invention is to provide a knitting machine with mechanism which will control the feeding of the splicing or reinforcing threads to the needles in such a manner that the line of intersection between the reinforced heel portion and the ordinary web constituting the leg portion will run at an incline to and gracefully intersect and merge into the wales of the leg portion.

Another object is to form a reinforced selvage along each edge of the fabric, said selvage conforming to the fashioning of the fabric and merging into a reinforced heel portion; the lines of intersection between the heel portion and the selvage and the web constituting the main leg section running at an incline to the wales of the fabric.

A still further object is to make the mechanism of my invention of a durable and simple construction which is easy of operation and which may be made and maintained at a very low cost.

Figure 2:
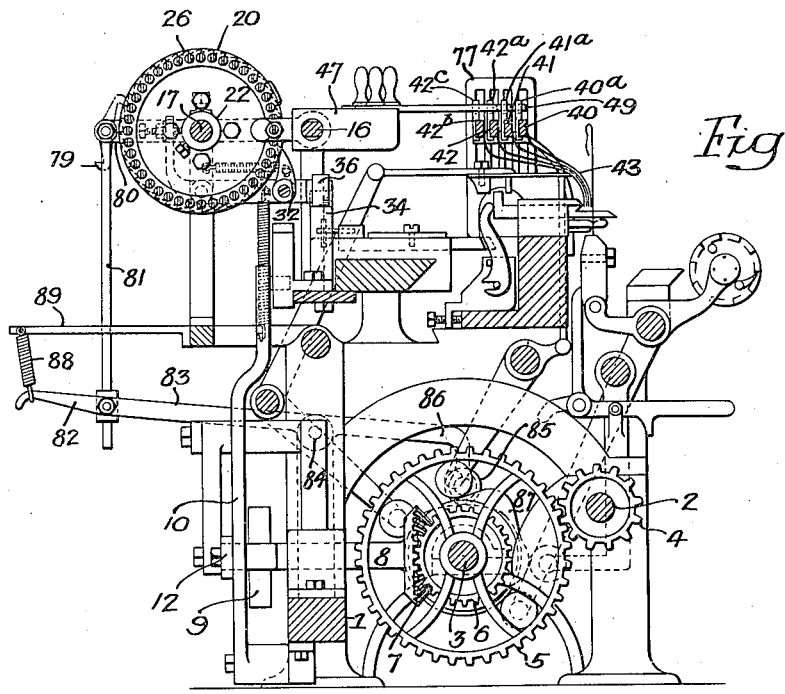
Figure 4:
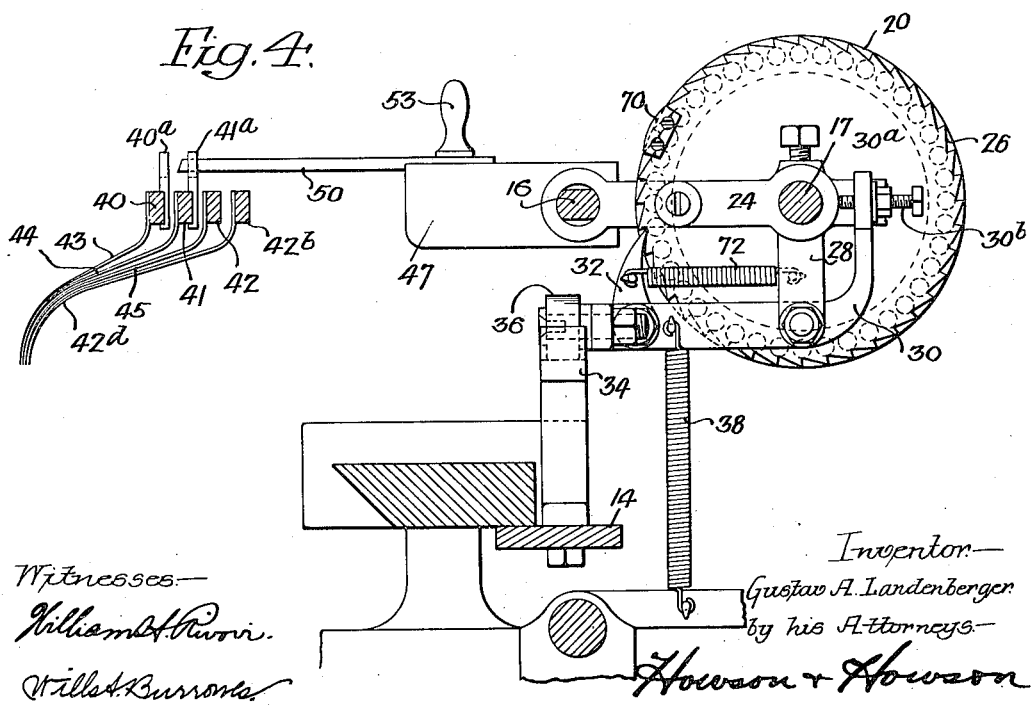
Figure 8:
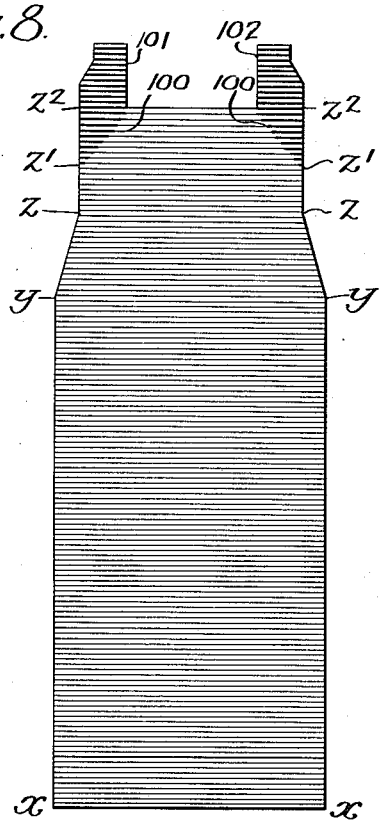
Figure 9:
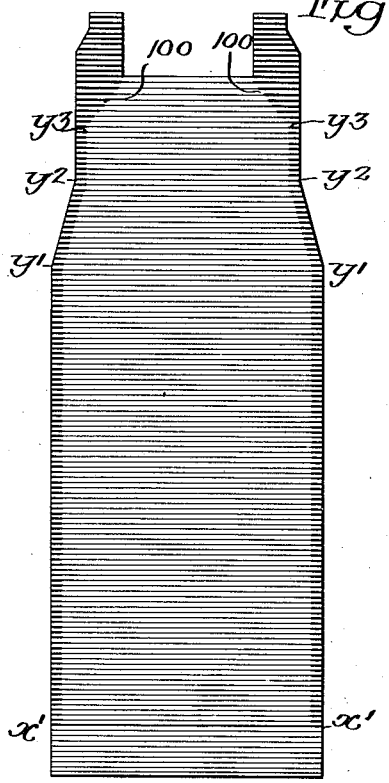
Figure 10:
Figure 11:
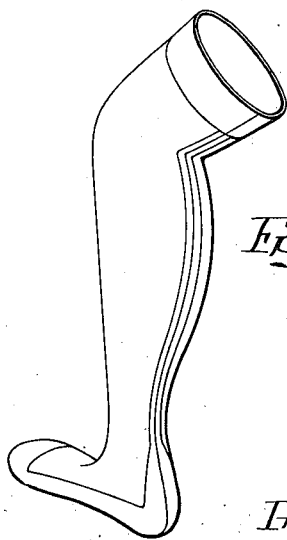

These and other objects which will be hereinafter described I attain in the following manner, reference being had to the accompanying drawings in which:

Figure 1, is a rear elevation of sufficient of a straight knitting machine of the above described type to illustrate my invention; Fig. 2, is a sectional end view taken on the line *a—a* Fig. 1; Fig. 3, is a plan view of the mechanism shown in Fig. 1; two banks of needles being shown; Fig. 4, is an enlarged sectional end view of certain of the mechanism comprising my invention; Fig. 5, is a plan view of Fig. 4 showing a diagrammatic representation of a stocking leg made with the aid of my invention; Fig. 6, is a fragmentary sectional elevation showing different positions of certain of the elements; Fig. 7, is a detail perspective view of one of the supporting members forming a part of my invention; Fig. 8, is a diagrammatic representation in a flat state of a stocking leg capable of being knitted by the aid of my invention; Fig. 9, is another diagrammatic representation in a flat state of a stocking capable of being made by the use of my invention, and which shows a reinforced selvage adjacent the seaming edges, said selvage merging into a reinforced heel section in which the line of intersection between the reinforced heel portion and the plain web runs at an incline to the wales of the fabric; Fig. 10, shows a stocking leg completed from the fabric shown in Fig. 8 and having a foot portion knitted thereto; Fig. 11, shows a stocking leg completed from the fabric as shown in Fig. 9 and having a foot portion knitted thereto; Fig. 12, is a fragmentary perspective view showing a hook pawl in engagement with a ratchet forming part of the operating mechanism of my invention; and Figs. 13 and 14, are views of modified forms of heel reinforcements, capable of being made with my invention.

Referring to the drawings, 1 is the main frame of a straight knitting machine, of the above described type, forming a support for a main power shaft 2 and a cam shaft 3 having intermeshing gear wheels 4 and 5 respectively. The cam shaft 3 is provided with a beveled gear 6 which meshes with a gear 7 on the shaft 8; the latter being known as the "Coulier" shaft and having keyed thereon a cam 9. A reciprocable lever 10 is pivoted to the frame 1 at 11 and in turn has pivoted thereto a link 12 pivotally swung from a stanchion 13 by means of an arm-link 13ª. Anti-friction rollers are journaled within the link 12 in such a manner that the cam 9 will operate therewith to actuate the said link 12 to reciprocate the lever 10 as is obvious from the construction shown in Fig. 1 of the drawing.

The frame 1 forms a support for the cock-box bar 14 and the lever 10 is so arranged as to engage and impart a reciprocating movement to the said cock-box bar. Supports 15 are rigidly fixed to the cock-box bar 14 and in turn form a support for a friction shaft 16; the latter being rigidly fixed in the said supports 15. The elements above mentioned are of a construction well known in the art. A shaft 17, which will be hereinafter termed the "pattern" shaft, is rigidly mounted on supports 18; the latter being mounted on frame 1. The shaft 17 forms a journal for two pattern drums 19 and 20 which are rotatable thereon but prevented from having any longitudinal movement by collars 21 and 22 and two-armed castings 23 and 24 respectively. The drums 19 and 20 are provided with ratchet wheels 25 and 26 respectively. The arms 27 and 28 of the castings 23 and 24 form pivotal supports for double ended levers 29 and 30; the latter having pawls 31 and 32 respectively pivotally mounted thereon; the pawls 31 and 32 being wide enough adapted to engage and being wide enough to project beyond the outer edge of the ratchet wheels 25 and 26, respectively.

The cock-box bar 14 forms a support for cams 33 and 34 and imparts a reciprocating movement thereto. The levers 29 and 30 have antifriction rollers 35 and 36 respectively which are so placed as to be engaged during the reciprocation of the cock-box bar 14 by the respective cams 33 and 34 to lift the levers 29 and 30 to cause the pawls 31 and 32 to rack with the respective ratchet wheels and intermittently move the drums 19 and 20 on their axes. The pawl supporting ends of the levers 29 and 30 are normally held in their lowest positions by means of tension springs 37 and 38 which are connected to the respective levers 29 and 30 and to a fixed portion of the machine. The ends 29ª and 30ª of the levers 29 and 30 are provided with adjusting or set screws 29ᵇ and 30ᵇ; the ends of the said set screws being adapted to be moved toward or from the respective castings 23 and 24 so as to be able to adjust the movement of the said levers 29 and 30 with respect to the cams and to the ratchet wheels 25 and 26.

The carrier-rod stands 39 and 39ª are rigidly attached to the frame 1 and in the present instance form a slidable support for four carrier rods 40, 41, 42 and 42ᵇ. The carrier rod 40 is the main carrier rod and has attached thereto a plurality of yarn guides or thread carriers 43, each of said carriers 43 being adapted to feed a thread to the needles of one section or bank of the machine in a multiple section machine such as herein described and illustrated to produce the leg portions of the stockings. The carrier rod 41 has a plurality of yarn guides or thread carriers 44; each being adapted to carry and feed an extra splicing or reinforcing thread to certain of the needles also fed by the carriers 43 to produce one-half of the reinforced heel portion of a stocking leg knitted on one section or bank of the needles. The carrier rod 42 has a plurality of yarn guides or thread carriers 45, and each of said carriers is adapted to carry and feed an extra splicing or reinforcing thread to certain needles also fed by the carriers 43 of respective banks of needles to produce the other half of the reinforced heel portions of the respective stocking legs as clearly shown in the several views of drawing.

The friction shaft 16 as illustrated in the accompanying drawings forms a support for three friction boxes 46, 47 and 48. These friction boxes may be of any well known construction having a friction producing substance such as leather or the like— always in contact with the friction shaft so that each friction box will slide over the friction shaft if sufficient force is applied thereto but ordinarily will move with the friction shaft. The friction boxes 46, 47 and 48 have slides 49, 50 and 51 respectively which may be moved by means of respective handles 52, 53 and 54 in a direction toward the carrier bars. The slide 49 when extended is adapted to pass between the prongs of a fork 40ª fixed to the bar 40. The slide 50 when extended is adapted to pass between the prongs of a fork 41ª fixed to the bar 41. In like manner the slide 51 when extended is adapted to pass between the prongs of a fork 42ª fixed to the bar 42 as clearly shown in Fig. 3. The carrier rod 42ᵇ is only used in finishing the heel portion and is provided with a fork 42ᶜ for a purpose hereinafter described. The frictional contact between each friction box and the friction shaft is such that the movement of the friction shaft will be imparted through the medium of the friction boxes to respective thread carrier bars unless the movement of the latter is obstructed in any manner. However, if the thread carrier bars 40, 41 and 42 are obstructed in their movement in either direction before the friction shaft has finished its movement in corresponding directions the latter will slip through the several friction boxes which necessarily stop when their respective thread carrier bars are stopped and when their slides are in engagement with respective forks. Thus it will be seen that if mechanism having a portion of varying contour is positioned so as to limit to different extents the movements of the several thread carrier bars, the thread carriers will be moved correspondingly to different extents and thereby feed yarn to different and variable numbers of needles in each bank or set of needles. To accomplish this end I set and fix within each pattern drum 19 and 20 by lock screws 59 and 60 respectively a series of pins 55 and 56 of varying length and mount on the friction boxes 47 and 48 adjustable abutment pins 57 and 58; the pin 57 being adapted to contact with the pins on the pattern drum 20, while the pin 58 is adapted to contact with the pins on the pattern drum 19. As shown in the accompanying drawings the pins are disposed in an annular figure and a movement of one tooth of each ratchet is sufficient to move successive pins into the path of their respective abutment pins on the friction boxes. The pins on the pattern drums 19 and 20 are prevented from working loose or varying their projected lengths by means of the lock screws 59 and 60 respectively.

In order to prevent the over running of the pattern drums due to their inertia caused by the movement of the respective pawls engaging the ratchet wheels thereon, I provide brakes 61 and 62 which in the present instance comprise threaded stems 63 and 64 having receptacles 65 and 66 adjacent one end; said receptacles having friction producing material forming shoes mounted therein and projecting therefrom so as to engage a surface of the pattern drums. The stems 63 and 64 may be adjusted by means of a screw-driver or other means so as to move the friction shoe toward or from the surface of the pattern drum. After being adjusted the brakes may be locked by means of nuts 67 and 68. These brakes are also so positioned as to counteract any lateral movement of the pattern drums which would otherwise be caused when the abutment pins contact with their respective pattern pins.

The ratchet teeth, as shown in the drawings adjacent respective short pattern pins of each pattern drum, are prevented from being engaged by the pawls 31 and 32 by dwell plates 69 and 70, which are screwed to the ribs of the ratchets and beyond the periphery of the ratchet teeth. However, these dwell plates may be moved to project beyond any of the teeth if it is so desired for any purpose, and their function will be described more fully in the operation of the machine. Tension springs 71 and 72 are connected between respective pawls 31 and 32 and tend to hold the said pawls in engagement with their respective ratchet teeth or with the dwell plates 69 and 70, so that for every upward movement of the levers 29 and 30 the ratchet wheels and pattern drums will be intermittently moved to the extent of one ratchet tooth except when the plates 69 and 70 pass underneath the pawls at which time the movement of the levers 29 and 30 will not move the pattern drums.

Fashioning screws 73 and 74 of the usual construction employed in straight knitting machines, are mounted adjacent opposite ends of the machine and are automatically operated at predetermined periods, by the usual mechanism, for moving the carrier rod stops 75, 75ª, 75ᵇ, 76, 76ª and 76ᵇ toward or from the adjacent ends of the respective carrier rods. As they are shown on the drawing; the stops 75 and 76 are adapted to arrest the movement of the carrier bar 40 in opposite directions; the stop 76ª is adapted to arrest the movement of the bar 41 and the stop 75ᵇ is adapted to arrest the movement of the bar 42; the stops 76ª and 75ᵇ only acting when the machine is knitting the heel portion as will be more fully described hereinafter. As shown in Fig. 6, the standard 77 which supports the stops 75, 75ª and 75ᵇ, and the standard 78 which supports the stops 76, 76ª and 76ᵇ are each slotted so that the stops 75ª, 75ᵇ, 76ª and 76ᵇ may be moved out of the way of the carrier rods 41 and 42 to permit the latter being slid through the slots. By this means the respective thread carriers are kept out of the boundary lines of the needle banks when the machine is knitting the plain or leg portion of the stocking and do not interfere with the movement of the thread carriers 43 during the knitting of the said plain leg portions.

In order to produce stocking legs having reinforced heel portions as shown in Fig. 8 the pattern drums are mounted on the shaft as clearly shown in Figs. 1 and 3 so that the free ends of the pattern pins on the drum 19 extend toward the stop support 77 and the free ends of the pins on the drum 20 extend toward the stop support 78. The abutment pins on the friction boxes 47 and 48 are so disposed as to contact with the ends of the pattern pins on respective pattern drums so that as the friction shaft moves the friction boxes 47 and 48 in one direction, the pin 58 on the friction box 48 will abut the end of a pattern pin on the drum 19, while the abutment pin 57 on the friction box 47 will move away from the ends of its coöperating pattern pin on the drum 20. On the opposite movement of the friction shaft however, the abutment pin 57 on the friction box 47 will move into contact with a pin of its pattern drum while the abutment pin 58 on the friction box 48 will move away from its coöperating pin on the pattern drum 19.

For purposes of producing a leg section as shown in Figs. 9 and 11 where the same is provided with a reinforced selvaged edge which continues from the top of the stocking throughout the entire length and merges into the reinforced heel portions in a manner as before stated, I provide an auxiliary means for rotating the drums 19 and 20 so that the reinforced selvaged edge may also be produced during the fashioning of the leg.

When the fashioning is taking place it is desirable that the reinforcing yarn adjacent the edges of the fabric shall follow the angle of the fashioned edge as shown in Fig. 13. To accomplish this end I throw the pawls 31 and 32 out of action and rotate the drums by ratchet hooks 79 respectively mounted on arms 80 so as to actuate the ratchets 25 and 26 of said drums once for each revolution of the cam shaft 3. Each arm 80 is pivotally connected by a rod 81 to the end 82 of a double-ended lever 83 pivotally supported to the frame 1 at 84.

In order to limit reinforced selvage edges as shown in Fig. 13, the pins on the pattern drums are placed so that those which control the reinforcing yarn at the fashioned portions have a step formation, that is, they are arranged in a series of sets of which those of each set are all of the same length but different in length from those of the other sets. This particular arrangement of pins will result in the production of the same number of courses of reinforcing yarn as there are pins in a set before there is a change in the amount of inward movement of the reinforcing yarn carriage and will produce neat and durable selvage edges at the fashioned portions of the stocking. It will be understood however that other arrangements or movements of the pattern pins may be employed to produce different forms of reinforced selvage edges without departing from my invention.

When the machine is not operating to form the fashioning, an antifriction wheel 85 on the end 86 of the double-ended lever 83 is held in contact with a disk 87 on the cam shaft 3 by a tension spring 88 having one end attached to an extension 89 of the frame 1 of the machine, and the other end attached to the end 82 of the lever, so that a rotation of the shaft 3 will not impart movement to the hook 79. As the cam shaft 3 receives a slidable or longitudinal movement from the automatically controlled mechanism 90, of any well known type, in order to form the fashioning of the leg portion in the usual manner, I provide a cam 91 which, when the said shaft 3 is longitudinally moved will slide under and come in contact with the anti-friction wheel 85 (see Figs. 1 and 2). As the shaft 3 is rotated a reciprocating movement will be imparted to the arm 80 and the ratchet hooks 79 will rack with the ratchet 25 thereby moving the drum 19 during the time when a fashioning is taking place for the reason that the said longitudinal movement of the shaft 3 also slides cams 92 and 93 into a path with antifriction wheels 94 and 95 respectively. Well known ratchet mechanism 96 and 97 actuates the fashioning screws 73 and 74 to move the carrier-rod stop supports 77 and 78 toward each other. When the fashioning, as just stated is completed, the shaft 3 will be automatically moved in the opposite direction and the cams 91, 92 and 93 will be moved away from their respective antifriction wheels 85, 94 and 95, thereby stopping the movement of the hook 79 and fashioning screws 73 and 74.

As the mechanism for effecting the knitting forms no part of my invention I have not illustrated or described the same in detail but have shown it in a general way on the drawing which will enable any one to follow out the purpose and construction of said invention.

When the machine is in a position to begin the knitting of stocking legs as shown in Fig. 8, each reinforcing thread carrier 44 and 45 is in a position outside the boundary of its respective needle bank (see Fig. 3 in dot-and-dash lines); the stops 76$^a$ and 75$^b$ having been moved out of the way to allow the carrier rods 41 and 42 to project through respective slots in the standards 78 and 77 (see Fig. 6). Also, the friction-box slides 50 and 51 are withdrawn from their respective forks on the carrier rods 41 and 42, and each main thread carrier 43 is adjacent one end of its respective bank of needles; the friction-box slide 49 being in engagement with the fork on the carrier rod 40. Also, when the stockings are being started the thread carriers 42$^d$ on carrier rods 42$^b$ are also out of action so as not to interfere with the main thread carriers 43 and the end of the bar 42$^b$ projects through a slot in the stop support 77.

The operation is as follows: Motion is imparted to the cam 9 through the medium of the main power shaft 2, gears 6 and 7, and Coulier shaft 8, and the said movement of the cam causes a reciprocating movement to be transmitted to the cock-box bar 14. As the friction shaft 16 and cams 33 and 34 are attached to the cock-box bar 14 they receive a reciprocating motion similar thereto. The movement of the friction shaft imparts motion to the carrier rod 40 through the medium of the friction box 46 and the thread carriers 43 are thereby reciprocated and feed yarn to all the needles. The limit of movement of the thread carriers 43 is determined by the distance between the carrier rod stops 75 and 76, as the rod 40 is so adapted as to strike each of the said carrier stops in its reciprocating movement. As the movement of the friction shaft is greater than the distance of travel of the carrier rod 40 as determined by the said stops 75 and 76 the friction box will move the said rod 40 until the latter strikes a stop 75 or 76 and then the friction shaft slides through the friction box 46 the difference in the amount of travel of the rod and the friction shaft; this same being true in both directions of the movement of the friction shaft and being rendered necessary as will be hereinafter described during the narrowing of the main web and when the stops 75 are brought closer together. After each thread carrier 43 has fed a length of yarn to the needles of its respective bank the usual knitting operation takes place to form the thread into loops. This operation of the thread carriers 43 takes place throughout the full width of the web which is knitted from points X—X to X—Y as clearly shown in the drawing in Figs. 3 and 8. During the knitting of this portion of the webs the selvage or garter top of the stocking is produced by transferring the first course of loops on to a subsequent course in the usual manner.

The machine illustrated in the drawing is provided with a well known mechanism for gradually moving the stop supporting standards 77 and 78 toward each other as above mentioned and after the stocking webs have been knitted to the point Y—Y.
This moving together of the stop supporting standards 77 and 78 with the stops 75, 75$^a$, 75$^b$, 76, 76$^a$ and 76$^b$ causes the stops 75 and 76 to gradually decrease the limit of movement of the carrier rod 40 and as the thread carriers 43 receive a movement equal to the movement of the carrier rod 40 they will feed yarn to a less number of needles for each movement of said rod in each direction. Therefore, as there are a smaller number of needles knitting for each reciprocation of the rod 40 the fabric will gradually be narrowed from each edge until the movement of the stops 75 and 76 toward each other is stopped by any well known mechanism, (one form of which is shown in Fig. 3 and acts to automatically move the cam shaft 3); such a narrowing of the fabric being shown in Figs. 3 and 8 from Y—Y to Z—Z. This narrowing or fashioning is well known in the art and is caused to produce a smaller diameter of the stocking leg, when seamed, so as to provide for the difference of diameter between the calf and the ankle portions thereof. After the said movement of the carrier rod stops has discontinued, the thread guides 43 will continue to feed threads to a number of needles equal to the width of the fabric at this point or the movement of the said carrier rod 40 at this point until the fabrics have been knitted to Z′, Z′.

After the fabrics have been knitted to the points Z′, Z′ the slide 50 is moved into engagement with the fork 41$^a$ on the carrier rod 41 and the slide 51 is brought into engagement with the fork 42$^a$ on the carrier rod 42. Also the pawls 31 and 32 are placed in mesh with the ratchets 25 and 26 and the drums 19 and 20 are so arranged that the longest pins 55 and 56 thereon are in alinement with respective abutment pins 58 and 57. After the carrier rods 41 and 42 have been moved so that their respective forks 41$^a$ and 42$^a$ are engaged by the slides 50 and 51 the stops 76$^a$ and 75$^b$ are raised into position to be abutted by the ends of the said rods 41 and 42. Also, the positioning of the several parts is such that a thread carrier 44 and a thread carrier 45 will be adjacent respective edges 98 and 99 of the fabric at the points Z′, Z′. A continued movement of the machine will then cause the cams 33 and 34 to raise the rollers 35 and 36 and through the medium of the levers 29 and 30 cause the pawls 31 and 32 to rack the ratchet wheels on the respective drums 19 and 20. At the same time the slides 49, 50 and 51 will impart motion to the respective thread carriers 43, 44 and 45 on the bars 40, 41 and 42 through the medium of the friction boxes 46, 47 and 48 on the friction shaft 16. Therefore, as the bar 40 is allowed to move the full movement as prescribed by the distance between the stops 75 and 76 the thread carriers 43 will continue to serve yarn to all the needles, which have previously been working during the knitting of the fabric from the points Z, Z to the points Z′, Z′ and thereby continue to knit a fabric of similar width. However, the thread carriers 44 and 45, during their movements inwardly from the edges of the fabrics due to the reciprocation of the friction shaft will be prevented from feeding yarn for the full width of the fabric at this point by the abutment pins 58 and 57 coming in contact with the said long pins 55 and 56, as the movement of the thread carriers 44 and 45 is dependent upon the movement of the friction boxes 48 and 47 and the abutment pins 58 and 57. The number of needles that the said thread carriers will serve with yarn will be in proportion to the distance between the abutment pins and the pins on the drums 19 and 20. As shown in the drawings the distance between the longest pins on either of the drums and the corresponding abutment pin is such as to allow for the feeding of about two needles for the first course in either direction and from opposite edges of the fabrics being knitted. As the pawls 31 and 32 operate for each second movement of the cock-box bar 14, shorter pins 55 and 56 will be brought into alinement therewith so that each thread carrier 44 and 45 will serve yarn to an increased number of needles for each reciprocation of the friction shaft 16. It will thus be seen that the splicing or reinforced courses formed by the said yarn carriers 44 and 45 starting at opposite edges and increasing in length will form a reinforcement in which the inner line of intersection of the reinforced courses with the single thickness fabric will form an angle 100 to the edges 98 and 99 of each fabric.

When the fabric has been knitted to the points $Z^2$, $Z^2$, the respective dwell plates 69 and 70 on the drums 19 and 20 will move the pawls 31 and 32 out of rack with the ratchet wheels 25 and 26 and thereby stop the movement of the said drums. When the pattern pins 55 and 56 are in alinement with their respective abutment pins 58 and 57, the slide 51 is operated to engage both the forks $42^a$ and $42^c$ on the respective carrier rods 42 and $42^b$ and the slide 50 is moved to engage both the forks $40^a$ and $41^a$ on the bars 40 and 41. A continued operation of the machine will then knit the heel flaps 101 and 102, the abutment pins 58 and 57 continuing to strike the low pins on the pattern drums 19 and 20. By coupling the forks as just described, the thread guides 43 and 44 will operate in unison to serve their threads for knitting one of the heel flaps while the thread guides 45 and $42^d$ will move in unison to serve their threads to the needles to produce the other heel flap. It is thus obvious that the flaps 101 and 102 when made as described will each consist of a plurality of interknitted threads.

When it is desired to knit a stocking leg having reinforced selvage edges as shown in Figs. 9 and 11 the pawls 31 and 32 are raised out of engagement with respective ratchet wheels 25 and 26 and the drums are turned so that a pin of proper length is brought into alinement with the respective abutment pins 58 and 57 to form a reinforced selvage of the proper width throughout the length of the fabric from $X'$, $X'$ to $Y'$, $Y'$, the hooked pawls 79 being brought into engagement with the respective ratchet wheels on the drums 19 and 20; as shown in Fig. 2 in dot-and-dash lines. Then as the fashioning starts, due to the said longitudinal movement of the shaft 3, the hooks 79 will tend to actuate the drum so as to provide for the reinforcing at the narrowing of the fabric between the point $Y'$, $Y'$ to $Y^2$, $Y^2$. The fashioning mechanism is then thrown out of engagement and there is a straight selvage knitted up to the points $Y^3$, $Y^3$ after which the pawls 31 and 32 are again allowed to engage their respective ratchets and form a heel splice in the manner as before stated and which merges from the said selvage. The heel flaps may be then knitted in the well known manner.

As machines of this type are made including the friction shaft and carrier rods very little change is required in providing the same with my invention.

In Figs. 13 and 14 I have shown two other forms of heel reinforcements which can be produced with my invention. In Fig. 14 while some of the lines of intersection run substantially at right angles to the courses, the "step" effect produces the gradual angle other than 90° to the courses.

I claim:

1. A machine for knitting full fashioned stocking webs with selvage edges, including a series of needles; means for supplying the needles with yarn to be knitted into said webs; means for supplying reinforcing yarn to those needles which knit the selvage edges and the portions of the web adjacent thereto to form a heel reinforcement; and means for rendering said latter yarn-supplying means operative to feed the reinforcing yarn to varying numbers of needles inwardly from the edge-producing needles during the knitting of successive courses to cause the inner ends of the courses of the heel reinforcement to define a line inclined to the wales and courses.

2. A machine for knitting full fashioned stocking webs with selvage edges, including a series of needles; a main yarn guide; means for moving said guide to supply yarn to the needles; a plurality of guides for supplying reinforcing yarn to the needles which knit the selvage edges and the portions of the web adjacent thereto near the ankle to form a heel reinforcement; and means for moving the reinforcing yarn guides different distances inwardly from the edge-producing needles in successive courses to cause the inner ends of the courses of the heel reinforcement to define a line inclined to the wales and courses.

3. A machine for knitting full fashioned stocking webs with selvage edges, including a series of needles; a main yarn guide; means for moving said guide to supply yarn to the needles; two guides for supplying reinforcing yarn to those of said needles which knit the selvage edges and portions adjacent thereto near the ankle to form a heel reinforcement; means for reciprocating the reinforcing yarn guides to also supply the reinforcing yarn to said latter needles; and means for stopping the reinforcing yarn guides at different points in successive courses to cause the inner ends of the courses of the heel reinforcement to define a line inclined to the wales and courses.

4. A machine for knitting full fashioned stocking webs with selvage edges, including a series of needles; a main yarn guide; means for moving said guide to supply yarn to the needles; two guides for supplying reinforcing yarn to those of said needles which knit the selvage edges and portions adjacent thereto near the ankle to form a heel reinforcement; means for reciprocating the reinforcing yarn guides to also supply the reinforcing yarn to said latter needles; and means for stopping the reinforcing yarn guides at points gradually increasing in distance inwardly from the selvage edges in successive courses to cause the inner ends of the courses of the heel reinforcement to define a line inclined to the wales and courses.

5. A machine for knitting full fashioned stocking webs with selvage edges, including a series of needles; a main yarn guide; means for moving said guide to supply yarn to the needles; two guides for supplying reinforcing yarn to those of said needles which knit the selvage edges and portions adjacent thereto near the ankle to form a heel reinforcement; means for reciprocating the reinforcing yarn guides to also supply the reinforcing yarn to said latter needles; and automatically operated graduated stops for arresting the reinforcing yarn guides on their inward movements to cause the inner ends of the courses of the heel reinforcement to define a line inclined to the wales and courses.

6. The combination in a full fashion knitting machine of a series of needles; a main carrier rod; a yarn guide thereon; means for moving said carrier rod to actuate the main yarn guide and thereby serve yarn to the needles; a second carrier rod; a yarn guide thereon; a third carrier rod; a yarn guide on the third carrier rod; a friction shaft; means for moving the friction shaft; a pattern shaft; two pattern drums on said pattern shaft, each having pins of varying lengths; a friction box on said friction shaft having a member placed to engage the second carrier rod and a portion positioned to strike the pins of one of the pattern drums; a second friction box on said friction shaft having a portion positioned to engage the third carrier rod and a portion placed to strike the pins of the second pattern drum; means timed with the fashioning mechanism for actuating the pattern drums to move pins of different lengths into line with the contacting portions of the friction boxes; with a second and independent means for actuating the pattern drums.

7. The combination in a knitting machine of a series of needles; a main yarn guide; a carrier therefor; means for moving said carrier; a reinforcing yarn guide; a carrier therefor; a cockbox bar; a friction shaft secured to said bar; means for actuating said bar; a pattern drum; a ratchet on said drum; a friction box on said friction shaft having a portion positioned to engage said second carrier and another portion placed to strike said pattern drum; a pawl for engagement with the ratchet; and means actuated by the movement of the cockbox bar for moving said pawl and thereby actuating the drum to bring different portions thereof into line with the contacting portions of said friction box.

8. The combination in a knitting machine of a series of needles; a main carrier rod; a yarn guide secured to said rod; means for moving the rod; a second carrier rod; a yarn guide secured thereto; a third carrier rod; a yarn guide secured to said third rod; a cock-box bar; a friction shaft secured thereto; means for moving the cock-box bar; a pattern shaft; a pattern drum on said shaft; a ratchet on said pattern drum; a series of pins of varying lengths secured in said drum; a second pattern drum on said pattern shaft; a ratchet on the latter drum; a series of pins of varying lengths secured to said drum; a friction box on the friction shaft having a portion adapted to engage the second carrier rod and another portion adapted to strike the pins on the first pattern drum; a second friction box on the friction shaft having a portion placed to engage the third carrier rod and having a second portion adapted to coöperate with the pins on the second pattern drum; pawls for engagement with the ratchet wheels; and means actuated by the movement of the cock-box bar to effect the movement of the said pawls to move the drums and thereby bring pins of different lengths into alinement with the contacting portions of the friction boxes.

9. The combination in a knitting machine of a series of needles; a main carrier rod; a yarn guide secured to said rod; means for moving the rod; a second carrier rod; a yarn guide secured thereto; a third carrier rod; a yarn guide secured to the same; a cock-box bar; a friction shaft secured thereto; means for moving the cock-box bar; a pattern shaft; a pattern drum on said shaft; a ratchet on said drum; a series of pins of varying lengths secured in the drum; a second pattern drum on said pattern shaft; a ratchet on the latter drum; a series of pins of varying lengths secured to the second pattern drum; a friction box on said friction shaft having a portion adapted to engage the second carrier rod and a portion adapted to strike the pins on the first pattern drum; a second friction box on the friction shaft having a portion placed to engage the third carrier rod and having another portion adapted to strike the pins on the second pattern drum; pawls for engagement with the ratchet wheels; cams mounted on the cock-box bar in position to actuate said pawls and move the pattern drums to bring pins of different lengths into alinement with the contacting portions of the friction boxes; and means for automatically disengaging said pawls from their respective ratchets.

10. The combination in a knitting machine of a series of needles; a main carrier rod; a yarn guide secured to said rod; means for moving the rod; a second carrier rod; yarn guide secured thereto; a cock-box bar;

a friction shaft secured to said cock-box bar; means for moving the cock-box bar; a pattern shaft; a pattern drum thereon; a ratchet on said drum; a series of pins of varying lengths secured in the drum; a second pattern drum on said pattern shaft; a ratchet on said second drum; a series of pins of varying lengths secured to the second pattern drum; a friction box on the friction shaft having a portion adapted to engage the second carrier rod and a portion adapted to strike the pins on the first pattern drum; a second friction box on the friction shaft having a portion capable of engaging the third carrier rod and having a portion placed to engage the pins on the second pattern drum; pawls placed to respectively engage said ratchet wheels; cams mounted on the cock-box bar and operating to effect movement of the said pawls to more respective pattern drums and thereby bring pins of different lengths into alinement with the contacting portions of the friction boxes; means for automatically disengaging said pawls from their respective ratchets; two other pawls placed to respectively engage said ratchets; and means, independent of the cock-box bar, for moving said latter pawls to cause the said drums to bring pins of different lengths into alinement with the contacting portions of the friction boxes.

11. The combination in a knitting machine of a series of needles; a main carrier rod; a yarn guide secured to said rod; means for moving the rod; a second carrier rod; a yarn guide secured thereto; a cock-box bar; a friction shaft secured to said cock-box bar; means for moving the cock-box bar; a pattern shaft; a pattern drum on said shaft; a ratchet on said drum; a series of pins of varying lengths secured in said drum; a second pattern drum on the pattern shaft; a ratchet on said second drum; a series of pins of varying lengths secured to the second pattern drum; a friction box on the friction shaft having a portion placed to engage the second carrier rod and a portion positioned to strike the pins on the first pattern drum; a second friction box on the friction shaft having a portion capable of engaging the third carrier rod and having a second portion adapted to engage the pins on the second pattern drum; pawls placed to respectively engage the ratchet wheels; cams mounted on the cock-box bar and operating to effect movement of the pawls and drums to bring pins of different lengths into alinement with the contacting portions of the friction boxes; means for automatically disengaging said pawls from their respective ratchets; two other pawls placed to respectively engage the ratchets; means independent of the movement of the cock-box bar for moving said latter pawls to cause the drums to bring pins of different lengths into alinement with the contacting portions of the friction boxes; and means for adjusting said latter portions of the friction boxes to compensate for wear.

12. The combination in a knitting machine of a series of needles; a main carrier rod; a yarn guide secured to said rod; means for moving the rod; a second carrier rod; a yarn guide secured thereto; a third carrier rod; a yarn guide secured to said third carrier rod; a cock-box bar; a friction shaft secured thereto; means for moving the cock-box bar; a pattern shaft; a pattern drum on said shaft; a ratchet on said drum; a series of pins of varying lengths secured in said drum; a second pattern drum on said pattern shaft; a ratchet on said second drum; a series of pins of varying lengths secured to the second pattern drum; a friction box on the friction shaft having a portion adapted to engage the second carrier rod and a portion adapted to strike the pins on the first pattern drum; a second friction box on the friction shaft having a portion capable of engaging the third carrier rod and having a second portion adapted to engage the pins on the second pattern drum; pawls placed to respectively engage the ratchet wheels; cams mounted on the cock-box bar and respectively operative to effect movement of said pawls and pattern drums to bring pins of different lengths into alinement with the contacting portions of the friction boxes; means for automatically disengaging said pawls from their respective ratchets; two other pawls mounted to respectively engage the ratchets; a fashioning shaft; and means actuated by said shaft for effecting movement of the said latter pawls to move the said drums to bring pins of different lengths into contacting alinement with the said contacting portions of the friction boxes.

In testimony whereof, I have signed my name to this specification, in the presence of two subscribing witnesses.

GUSTAV A. LANDENBERGER.

Witnesses:
   CLYDE T. MOYER,
   WM. A. BARR.